United States Patent
Varale

(10) Patent No.: US 10,927,980 B2
(45) Date of Patent: Feb. 23, 2021

(54) SUPPORT COLLAR FOR CABLES, PIPES OR THE LIKE

(71) Applicant: Fi.Mo.Tec. S.p.A., Milan (IT)

(72) Inventor: Alberto Varale, Cologne Monzese (IT)

(*) Notice: Subject to any disclaimer, the term of this patent is extended or adjusted under 35 U.S.C. 154(b) by 0 days.

(21) Appl. No.: 16/433,160

(22) Filed: Jun. 6, 2019

(65) Prior Publication Data
US 2020/0041039 A1 Feb. 6, 2020

Related U.S. Application Data

(63) Continuation of application No. 29/658,967, filed on Aug. 3, 2018.

(51) Int. Cl.
*F16L 3/08* (2006.01)
*F16L 3/10* (2006.01)
*F16L 3/13* (2006.01)

(52) U.S. Cl.
CPC .............. *F16L 3/1075* (2013.01); *F16L 3/13* (2013.01)

(58) Field of Classification Search
CPC . F16L 3/222; F16L 3/1211; F16L 3/13; F16L 3/2056; F16L 3/21; F16L 3/1075; F16B 2/20; F16B 2/22; H02G 3/32
USPC ..... 248/74.1, 74.2, 73, 65; 24/455; 174/68.1
See application file for complete search history.

(56) References Cited

U.S. PATENT DOCUMENTS

| 8,439,316 B2* | 5/2013 | Feige ............... F16L 3/10 248/71 |
| 10,637,226 B2* | 4/2020 | Bell ................ H02G 3/32 |
| 2009/0294602 A1* | 12/2009 | Korczak ............ H02G 3/30 248/74.2 |
| 2011/0226913 A1* | 9/2011 | Feige ............... F16L 3/12 248/74.2 |
| 2016/0281881 A1* | 9/2016 | Vaccaro ............ H02G 3/32 |
| 2017/0122460 A1* | 5/2017 | Joshi ............... F16L 3/222 |

* cited by examiner

Primary Examiner — Todd M Epps
(74) Attorney, Agent, or Firm — Themis Law

(57) ABSTRACT

A support collar for cables, pipes or the like includes a head portion having a pass-through opening; two side portions extending from the head portion and ending with abutment portions disposed substantially parallel to the head portion and with a coupling element adapted to engage the collar onto a support plate or the head portion of another support collar; and retaining members within the housing area for retaining firmly the cable or pipe. The retaining members include a clip having retaining arms that extend inside the housing area and can be elastically splayed to engage the cable or pipe due to an elastic pressure exerted transversely thereon. Each of the retaining arms cooperates with a flap that extends into the housing area opposite of the retaining arms, so that the flap is abutted against the retaining arm when the cable or pipe is engaged in the clip.

14 Claims, 7 Drawing Sheets

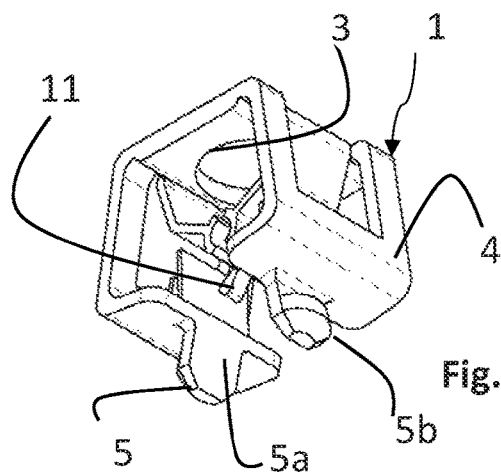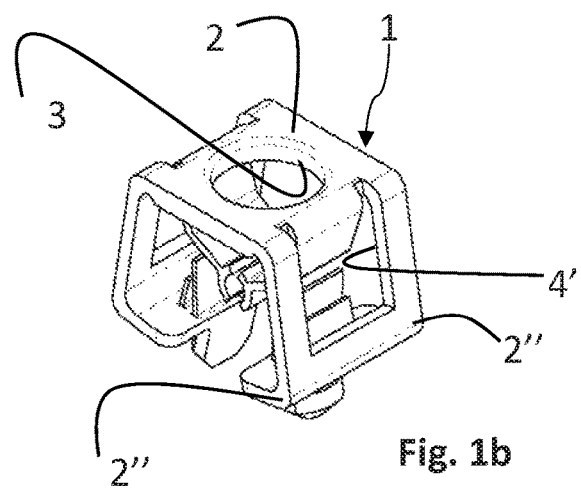
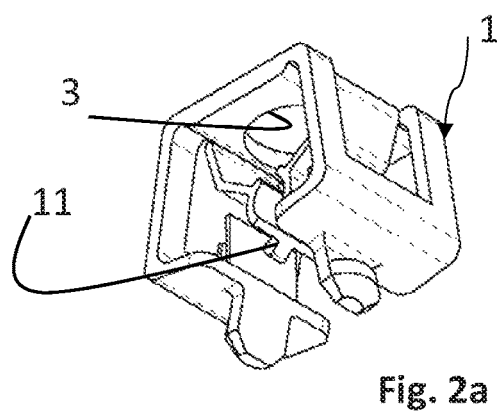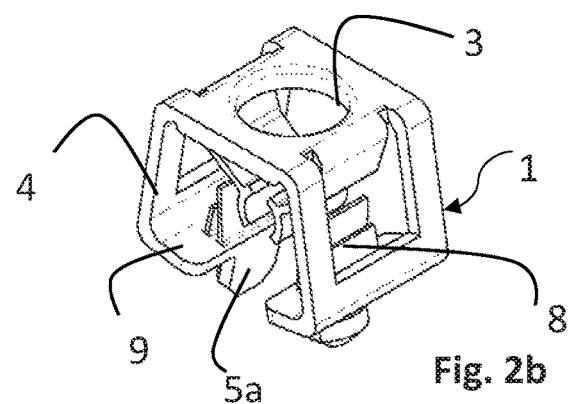
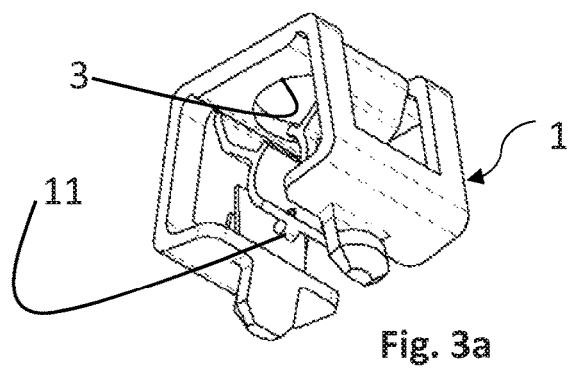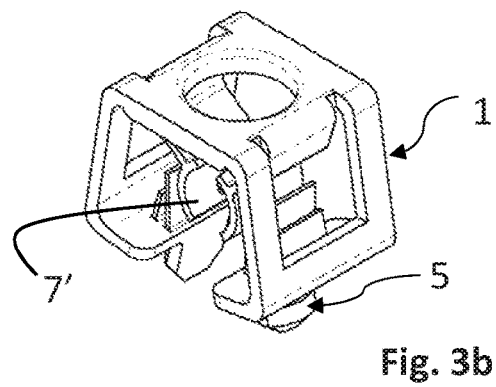
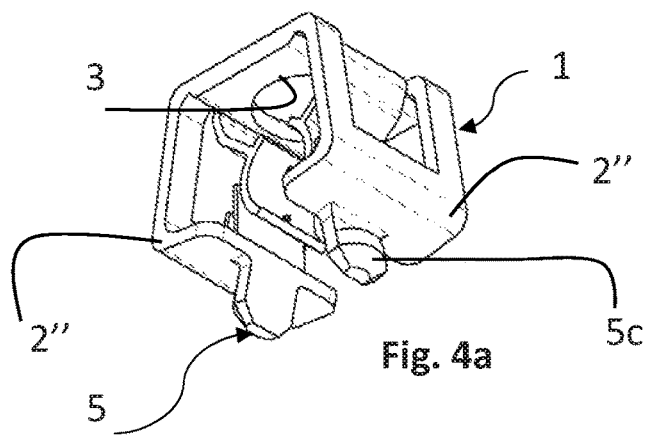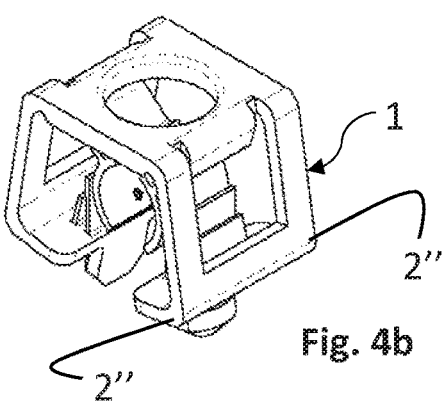

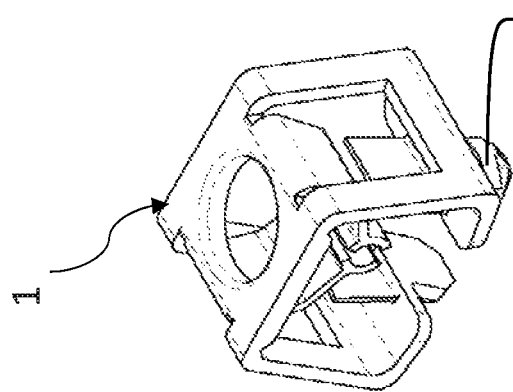
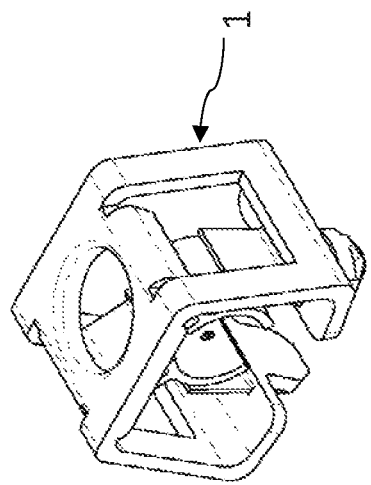
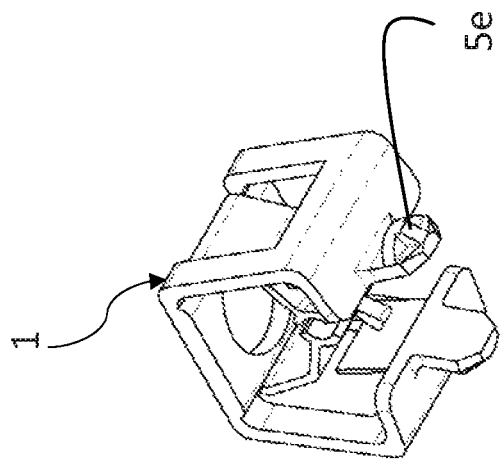
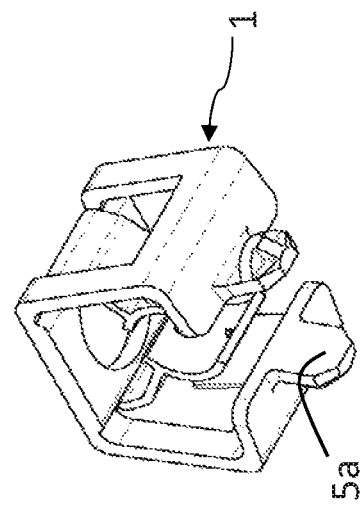
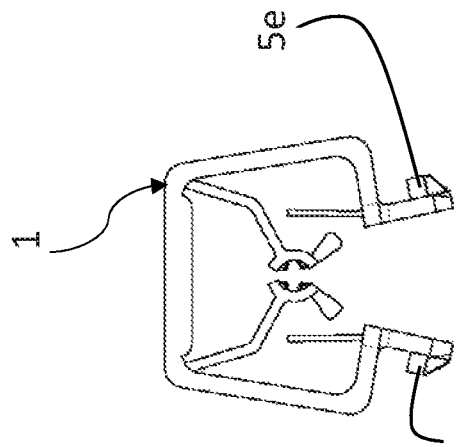
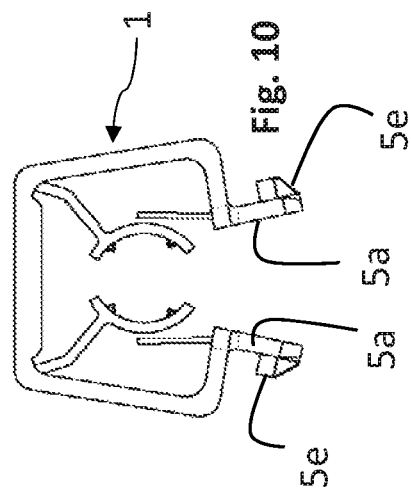

SUPPORT COLLAR FOR CABLES, PIPES OR THE LIKE

FIELD OF THE INVENTION

The present invention relates to a support collar for cables, tubes or the like.

BACKGROUND OF THE INVENTION

As it is known, the supporting of cables or pipes in the telecommunications and building sector is achieved by using one or more support collars that can be fixed on perforated plates.

Support collars in fact comprise relatively elastic structures obtained by means of respective open profiles, which can be splayed to be rapidly fitted onto the cables or tubes to be supported.

In document EP 2464907, a support collar is described comprising a laminar structure provided with a flat head portion with a central opening, two side portions extending transversely from said head portion and each having a coupling element suitable for engaging said collar on a support plate or a flat head portion of a further support collar, a retaining clip for a long-shaped article positioned in the area determined by said head portion and said two side portions. Said retaining clip is formed from the structure of a respective side portion of the collar.

This allows a saving of the material used for the production of the support collars; however, it limits the possibility of freeing the shape and dimensions of the arms of the clip from the dimensions of the side portions.

The elasticity of the retaining arms of said clip together with the presence of side portions without structural folds gives an elastic yield which allows the support collar to easily adapt to different geometries and/or dimensions of the cables or pipes.

It is evident, however, also from the figures, that the collar described in document EP 2464907 cannot adapt, without the use of sleeves, to cables or pipes having an extremely reduced diameter.

The negative impact of the passive intermodulation or Pim phenomenon on the infrastructure of mobile radio networks is also known.

Basically, passive intermodulation takes place when various radiofrequency signals, coming from one to several radio base stations, mix together in a site that houses a cell, giving rise to a signal that contains a new set of frequencies.

Undesired signals due to passive intermodulation are generated due to some form of mechanical non-linearity. One of the major causes is the inconsistency of the contacts between metal and metal in the areas affected with high current intensities, such as those inside the transmission lines or within the radiofrequency (RF) components. This may be due to the imperfect preparation of the RF terminations or non-optimal assembly procedures, loosening of screws or rivets inside the RF components, contaminated or oxidized surfaces of the connectors or RF connectors that are not properly tightened.

Passive intermodulation can therefore potentially considerably degrade the quality of the service of new networks, for example Lte (Long Term Evolution) and Hdspa+ (High Speed Downlink Packet Access), and it is of primary importance for telecommunications operators to reduce the negative effects of passive intermodulation in order to be able to install more advanced network infrastructures capable of supporting the transporting of broadband data, without a significant increase in costs and without jeopardizing the performance level.

SUMMARY OF THE INVENTION

The objective of the present invention is to provide a support collar for cables, pipes or the like capable of solving the problems described above.

In particular, the objective of the present invention is to provide support collars with an elastically deformable structure and suitable for supporting cables having different geometries and sections, i.e. cables whose thicknesses vary from narrow cross-sections to wide sections.

A further objective of the present invention is to provide stackable support collars which are easy to position along the longitudinal development of the cables or pipes and which guarantee the stable locking of cables and pipes, or the like.

Another objective of the present invention is to reduce the production and marketing costs of support collars.

Yet another objective of the present invention to provide support collars which can eliminate the problem of the passive intermodulation phenomenon.

The objectives described above are achieved by means of a support collar produced according to what is described hereinafter.

BRIEF DESCRIPTION OF THE DRAWINGS

The structural and functional characteristics of the present invention and its advantages with respect to the known art will appear even more evident from the following description, referring to the attached schematic drawings, which show non-limiting embodiment examples of the invention itself. In the drawings:

FIGS. 1a and 1b are perspective views of the collar of FIG. 1;

FIGS. 2a and 2b are perspective views of the collar of FIG. 2;

FIGS. 3a and 3b are perspective views of the collar of FIG. 3;

FIGS. 4a and 4b are perspective views of the collar of FIG. 4;

FIG. 9 is a front view of a support collar for cables, pipes or the like, partly splayed, produced according to a third embodiment of the present invention, for locking cables;

FIGS. 9a and 9b are perspective views of the collar of FIG. 9;

FIG. 10 is a front view of a support collar for cables, pipes or the like, partly splayed, produced according to a third embodiment of the present invention, for locking cables with a larger diameter than the diameter of the cable lockable in the collar of FIG. 9;

FIGS. 10a and 10b are perspective views of the collar of FIG. 10;

DETAILED DESCRIPTION OF EMBODIMENTS OF THE INVENTION

Figure 1:
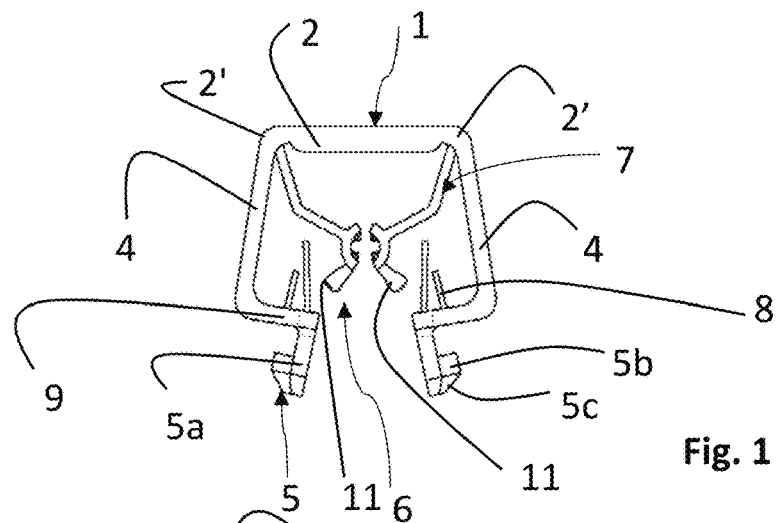
FIG. 1 is a front view of a support collar for cables, pipes or the like, partly splayed, produced according to a first embodiment of the present invention, for locking cables.
Figure 2:
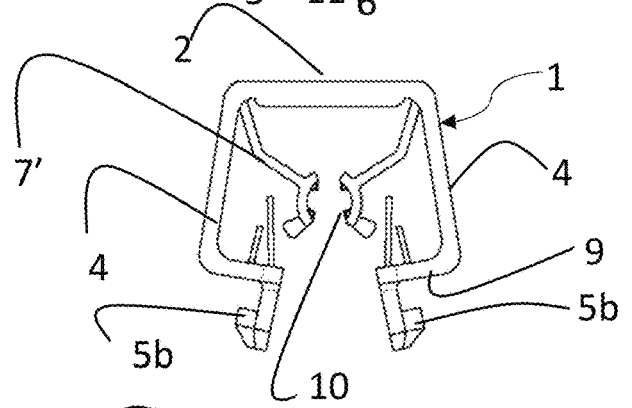
FIG. 2 is a front view of a support collar for cables, pipes or the like, partly splayed, produced according to a first embodiment of the present invention, for locking cables with a larger diameter than the diameter of the cable lockable in the collar of FIG. 1.
Figure 3:
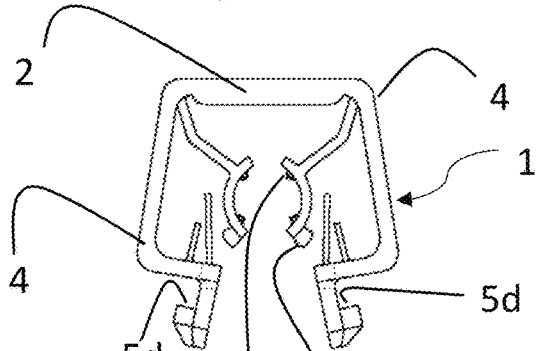
FIG. 3 is a front view of a support collar for cables, pipes or the like, partly splayed, produced according to a first embodiment of the present invention, for locking cables with a larger diameter than the diameter of the cable lockable in the collar of FIG. 1 or 2.
Figure 4:
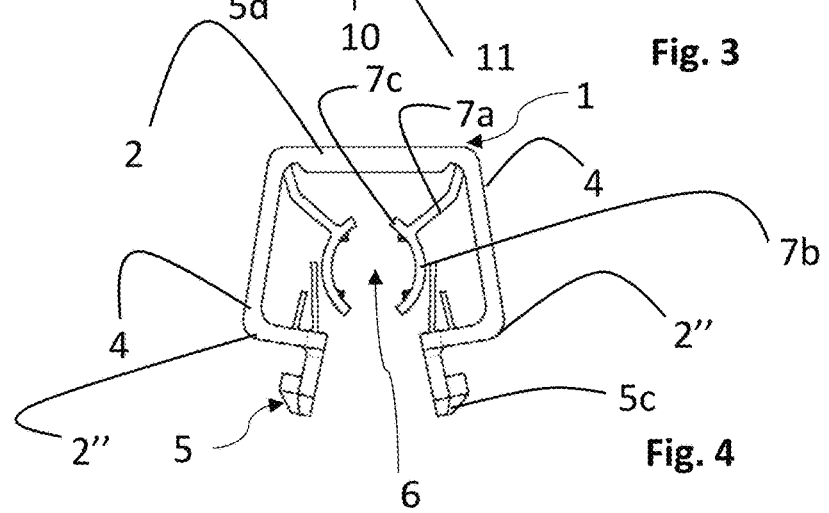
FIG. 4 is a front view of a support collar for cables, pipes or the like, partly splayed, produced according to a first embodiment of the present invention, for locking cables with a larger diameter than the diameter of the cable lockable in the collar of FIG. 1, 2 or 3.
Figure 5:
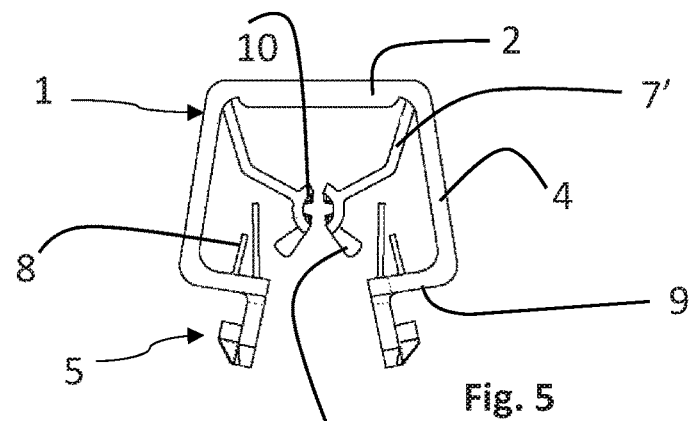
FIG. 5 is a front view of a support collar for cables, pipes or the like, partly splayed, produced according to a second embodiment of the present invention, for locking cables.
Figure 6:
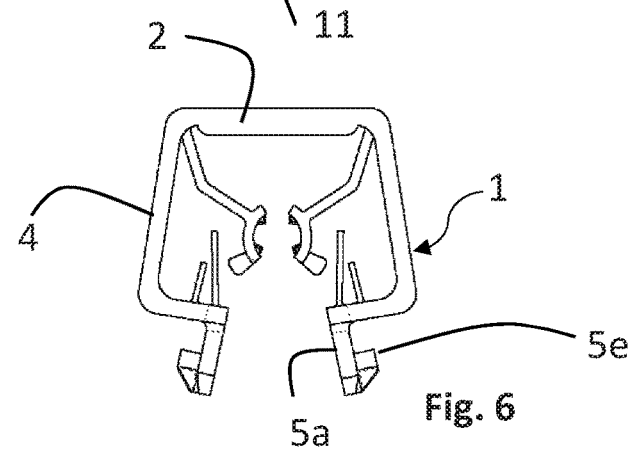
FIG. 6 is a front view of a support collar for cables, pipes or the like, partly splayed, produced according to a second embodiment of the present invention, for locking cables with a larger diameter than the diameter of the cable lockable in the collar of FIG. 5.
Figure 7:
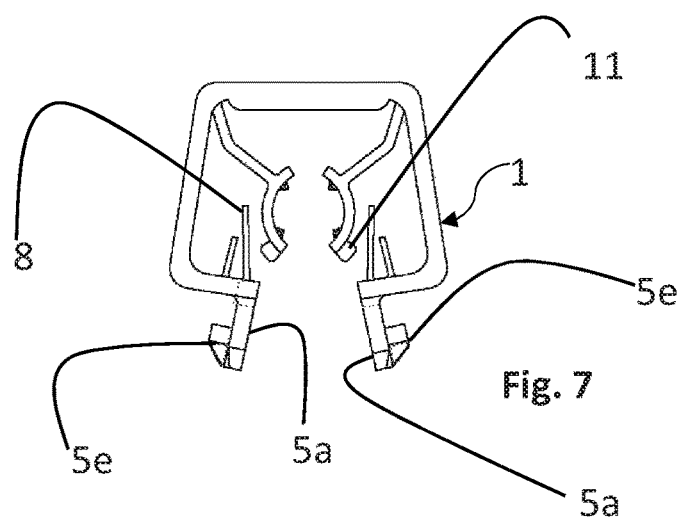
FIG. 7 is a front view of a support collar for cables, pipes or the like, partly splayed, produced according to a second embodiment of the present invention, for locking cables with a larger diameter than the diameter of the cable lockable in the collar of FIG. 5 or 6.
Figure 8:
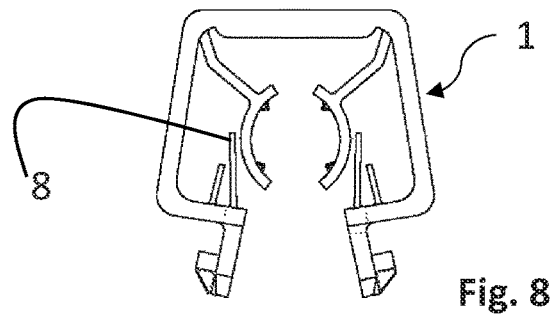
FIG. 8 is a front view of a support collar for cables, pipes or the like, partly splayed, produced according to a second embodiment of the present invention, for locking cables with a larger diameter than the diameter of the cable lockable in the collar of FIG. 5, 6 or 7.
Figure 5A:
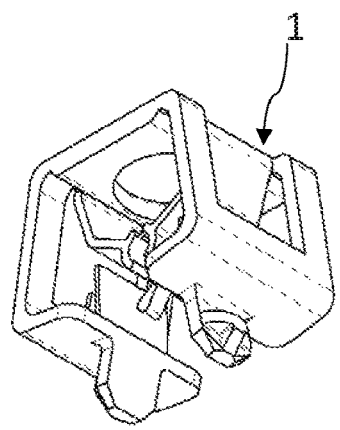
FIGS. 5a and 5b are perspective views of the collar of FIG. 5.
Figure 5B:
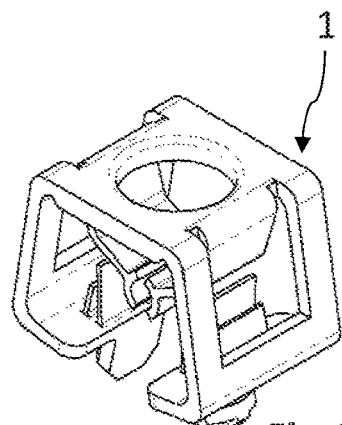
Figure 6A:
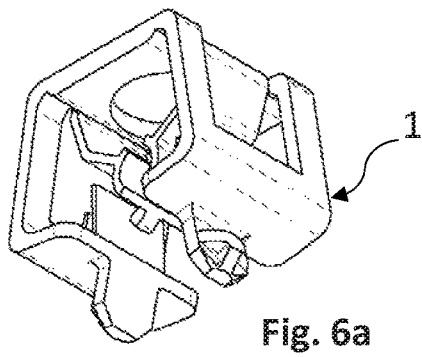
FIGS. 6a and 6b are perspective views of the collar of FIG. 6.
Figure 6B:
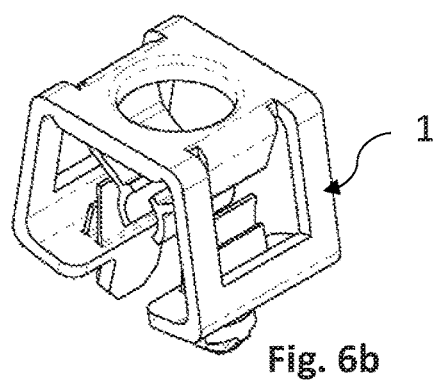
Figure 7A:
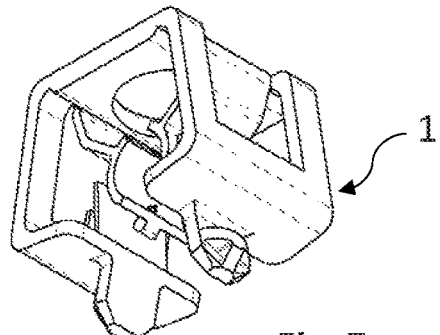
FIGS. 7a and 7b are perspective views of the collar of FIG. 7.
Figure 7B:
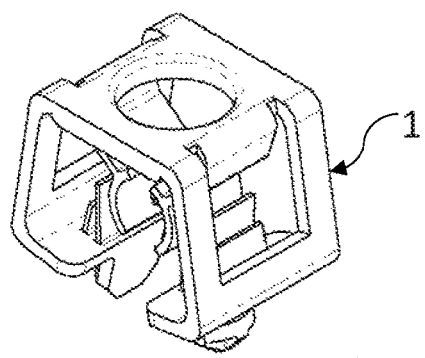
Figure 8A:
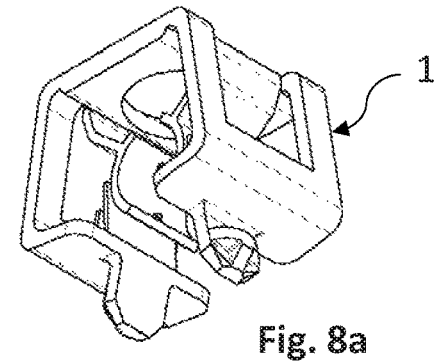
FIGS. 8a and 8b are perspective views of the collar of FIG. 8.
Figure 8B:
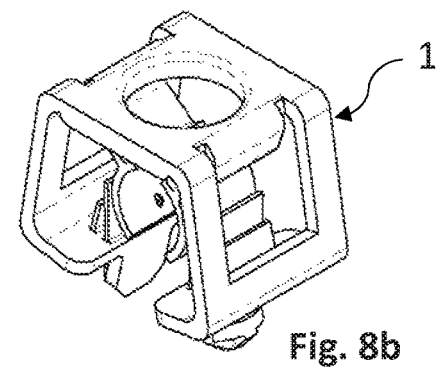

With reference to the figures, a support collar for cables, pipes or the like is indicated as a whole with 1.

The support collar 1 is made of a plastic material.

In particular it is made of a flexible, elastic and resistant plastic material.

According to the present invention the support collar 1 for cables, pipes or the like comprises:

a head portion 2, having at least one pass-through opening 3;

two side portions 4 extending transversely and substantially perpendicularly from said head portion 2 and ending with two respective abutment portions 9 positioned parallel to said head portion 2;

each of said abutment portions 9 being provided with at least one respective coupling element 5 suitable for engaging said collar 1 on a support plate 15 or a head portion 2 of a further support collar 1, said side portions 4, said abutment portions 9 and said head portion 2 of said support collar 1 delimiting an area 6 for the partial housing of said cable or pipe C to be supported;

retaining means in correspondence with said housing area 6 to keep said cable or pipe C firmly within said area 6.

Said retaining means comprise at least one clip 7 provided with at least two retaining arms 7' which extend inside said housing area 6.

Said arms 7' of said retaining clip 7 are flexibly connected to at least one of said portions 2, 4, 9 of the collar 1 and can be elastically splayed to engage said cable or pipe C and withhold the latter within said housing area 6 upon the action of an elastic pressure exerted transversely with respect to the longitudinal development of said cable or pipe C, each of said at least two retaining arms 7' cooperates with at least one flap 8 which extends into the housing area 6, said at least one flap being positioned opposite the retaining arms 7', so that said at least one flap 8 is abutted against said at least one retaining arm 7' when the cable or pipe C is engaged in said at least one clip 7.

Said opening 3, shown as circular, can have any shape, such as, for example, rectangular, square, elliptical or the like.

Furthermore, the opening 3, according to an embodiment not shown, can be surrounded by a reinforcement collar.

Said head portion 2, said two side portions 4 and said abutment portions 9 preferably have a substantially flat development.

Thanks to the coupling element 5, each abutment portion 9 of the support collar 1 can therefore be arranged against a corresponding surface of the support plate 15 or the head portion 2 of another support collar 1.

Said two side portions 4 extend perpendicularly, or obliquely, with respect to the head portion 2 to define a square, inverted U-shaped open profile.

Each of said two side portions has at least one window 4' so that said side portion is produced in the form of a frame, giving the collar 1, in particular the two side portions 4, a certain lightness and elastic yield along directions transverse to said side portions side 4.

Figure 12:
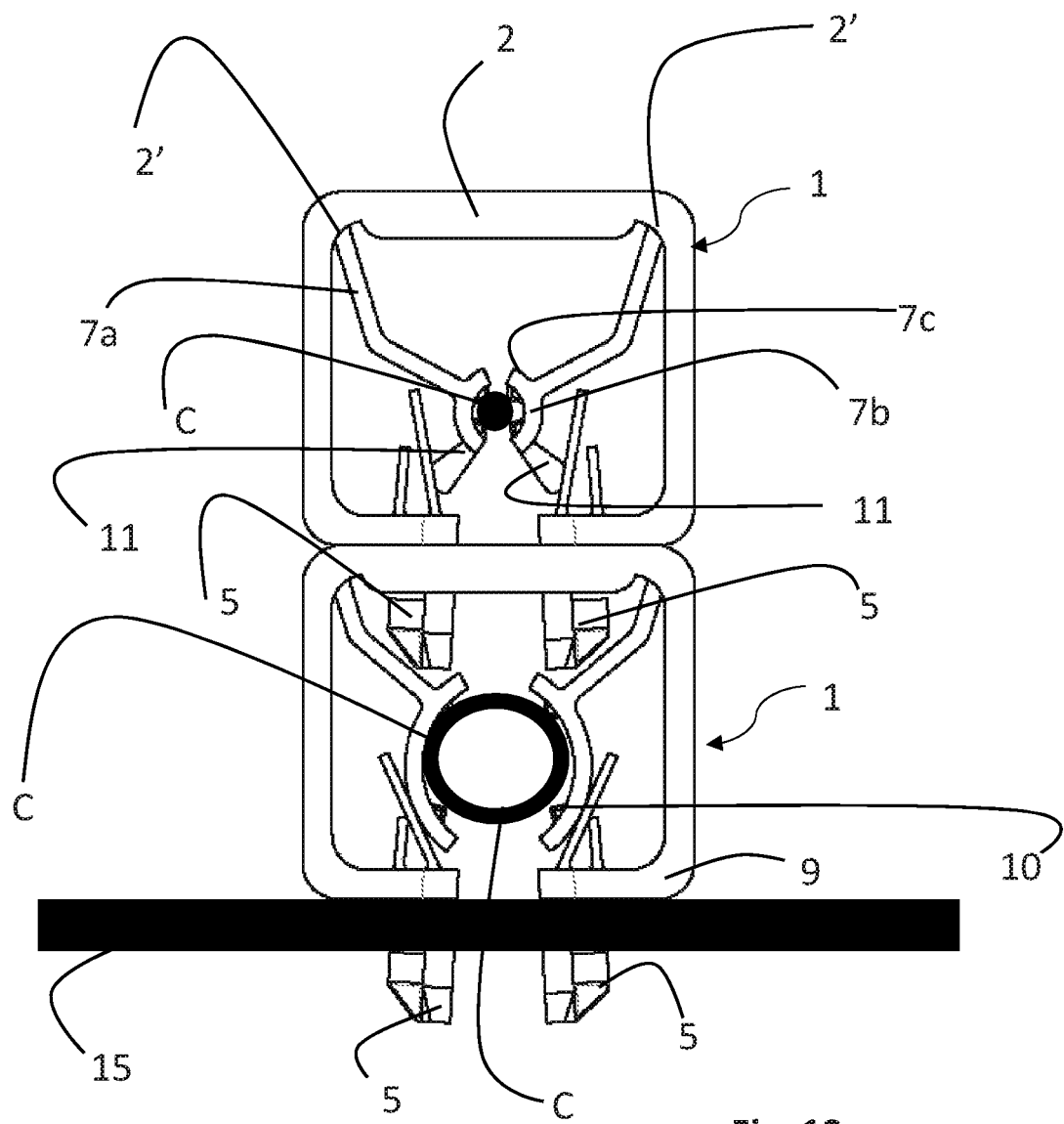
FIG. 12 is a schematic front view of two support collars, according to the previous figures, stacked on top of each other and engaged on a support plate.

As is evident from the figures, the two side portions 4, the two abutment portions 9 and the head portion 2 of each collar 1 delimit an area 6 for the partial housing of an electric cable, a conduit, a pipe, a bar or similar objects having an elongated shape C (FIG. 12).

The retaining means such as at least one clip 7, with at least two arms 7', and flaps 8 are provided within said area 6, in order to keep the cable or pipe C in a stable position.

As illustrated in the figures, said retaining arms 7' are preferably flexibly connected to the corresponding edge 2' of said head portion 2 with said side portions 4 and said at least one flap 8 extends from the surface facing said housing area 6 of each abutment portion 9 towards said head portion 2.

Each of the two arms 7' of said retaining clip 7 cooperates with at least one flap 8 which extends obliquely from the surface, facing the housing area 6, of each abutment portion 9 towards the corresponding side portion 4.

More specifically, said at least one flap 8 bends slightly towards the corresponding side portion 4, when it is abutted or in direct or indirect contact through at least one abutment element 11, as described hereunder, with the corresponding retaining arm 7' in the presence of the cable or pipe C inserted between said two arms 7'.

The retaining arms 7' can be elastically splayed to withhold the cable or pipe C by transversely exerting on the latter, in combination with said flaps 8, a pressure sufficient for keeping it in a stable position, whatever the diameter of said cable or pipe C may be.

The arms 7', cooperating with the respective flap(s) 8, transversely constrain the cable or pipe C to the support collar 1, thus facilitating the operators in mounting the cables or pipes C.

According to an embodiment not illustrated, the cable or pipe C can be held by arms 7' which extend from respective edges positioned on the opposite side of the head portion 2, in correspondence with the coupling elements 5, said arms 7' cooperating with flaps 8 provided on the head portion 2, laterally with respect to the pass-through opening 3, and which extend inside the housing area 6.

There can obviously also be the provision that the arms 7' extend inside the housing area 6 starting directly from the side portions 4 or from the head portion 2, adjacent to the opening 3.

With reference to the retaining means 7 and in particular to the arms 7', each retaining arm 7' comprises a first substantially V-shaped segment 7a which extends from a respective edge 2', 2'' of the collar 1 towards the centre of the housing area 6. A second curved segment 7b develops from said first segment 7a, with a concavity directed towards the centre of the housing area 6 which provides a suitable resting surface for the outer surface of the cable or pipe C to be supported.

A third segment 7c extends from the first segment 7a, in the opposite direction to the second curved segment 7b, towards the centre of the housing area 6, with a curvature similar to the second segment 7b to define a further housing and engagement portion of the cable or pipe C.

In order to increase the grip of the arms 7', one or more teeth, dowels or retaining blades 10 can be provided on the curved surface of said second segment 7b and/or third segment 7c, facing the centre of the housing area 6 and destined for coming into contact with the outer surface of the cable or pipe C to be supported.

As it can be seen from the figures, said segments 7a, 7b and 7c can have different dimensions and curvatures so as to adapt to the dimensions of the cable or pipe C to be supported.

In particular, as shown in FIGS. 1-4 and 5-8, the second segment 7b has dimensions and/or curvature which vary according to the diameter of the cable or pipe C.

As is evident from the figures, the second segment 7b of the arm 7' of each side portion 4, in particular its surface opposite to that facing the centre of the housing area 6 and therefore its surface opposite to that in contact with the cable or pipe C, cooperates with at least one flap 8 provided on each abutment portion 9 and facing the housing area 6.

Said flap 8 ensures a stable and secure positioning of the cable or pipe C between the arms 7' of the retaining means 7, when the support collar 1 is constrained to the support plate 15 or to a further support collar 1.

When the cable or pipe C is engaged between the arms 7' of the retaining means 7, as said arms 7' are elastically yielding, they receive the cable in correspondence with the second segment 7b and rest on the surface of said flaps 8, which, as they are elastically yielding, offer an elastic resistance to a further and excessive splaying of the arms 7', guaranteeing a stable retention of the cable in the housing area 6 of the support collar 1.

In particular, the outer surface of said arms 7', facing the side portions 4, in correspondence with the second segment 7b, comes into contact, directly or indirectly, with the surface of said flaps 8.

At least one flap 8 for each of the two abutment portions 9 can be provided.

According to an embodiment illustrated for example in FIGS. 1-8, two flaps 8 are preferably provided, positioned parallel to each other, for each of the two abutment portions 9, the second flap 8 of each portion 9 increasing the elastic resistance offered for splaying the arms 7' when the cable or pipe C is inserted in the retaining means 7.

FIGS. 9 and 10, on the other hand, show a further embodiment with a flap 8 extending from each of the two abutment portions 9.

As illustrated in the figures, in particular in FIGS. 1, 2, 3, 5, 6, 7, in order to ensure contact between the arms 7', in particular between the second segments 7b and said flaps 8, at least one abutment element 11, in the form of a tooth or the like, can be provided on the outer surface of each of said second segments 7b of the arms 7', i.e. on the surface of said second segments 7b directed towards each side portion 4, which ensures indirect contact between the flaps 8 and arms 7' even when the cable or pipe C has a reduced diameter and consequently the retaining means 7 of said cable or pipe C, in turn having reduced dimensions, are positioned centrally in the housing area 6, occupying a small space inside said area 6, and thus being positioned spaced apart from said flaps 8.

As is evident from the figures, the function of retaining the cable or pipe C by the retaining means 7 is independent and not conditioned by the coupling function of the support collar 1 to the support plate 15 or to a further support collar 1.

The retaining arms 7' ensure the engagement of the collar 1 to the cable or pipe C independently of the engagement of the support collar 1 and another collar 1 or plate 15.

This offers the advantage of making it easier for operators to mount the cables.

The coupling element 5 of each side portion 4 of the support collar 1 extends, externally to the housing area 6, from the surface of a respective abutment portion 9, said abutment portion 9 extending substantially parallel to the head portion 2 with a substantially flat development to ensure a stable support of the support collar 1 to the plate 15 or to the head portion 2 of another support collar 1.

Thanks to the coupling element 5 the collar 1 is abutted on another collar 1 or a plate 15.

With reference to FIGS. 1-4, each coupling element 5 comprises a plate 5a which extends transversely, perpendicularly to the surface of the abutment portion 9, on the opposite side with respect to the head portion 2. A wedge-shaped element 5b with a rounded profile and an inclined surface 5c with respect to the plate 5a, is provided on the surface of said plate 5a, to facilitate the introduction of the coupling element 5 into the opening 3 of a second support collar 1 or into the hole of a plate 15.

Figure 11B:
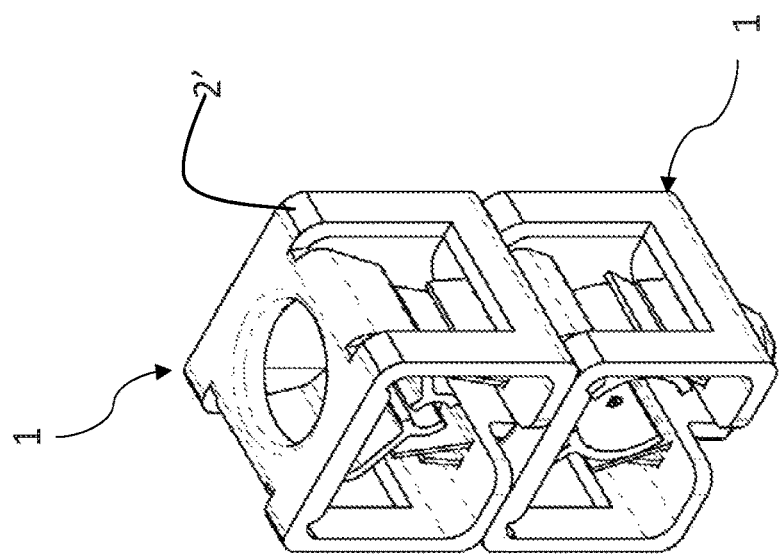
FIGS. 11a and 11b are perspective views of the stacked collars of FIG. 11.
Figure 11A:
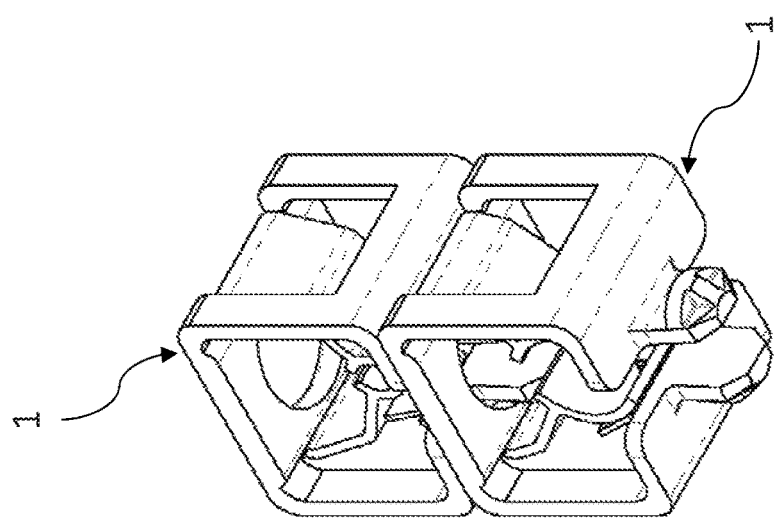
Figure 11:
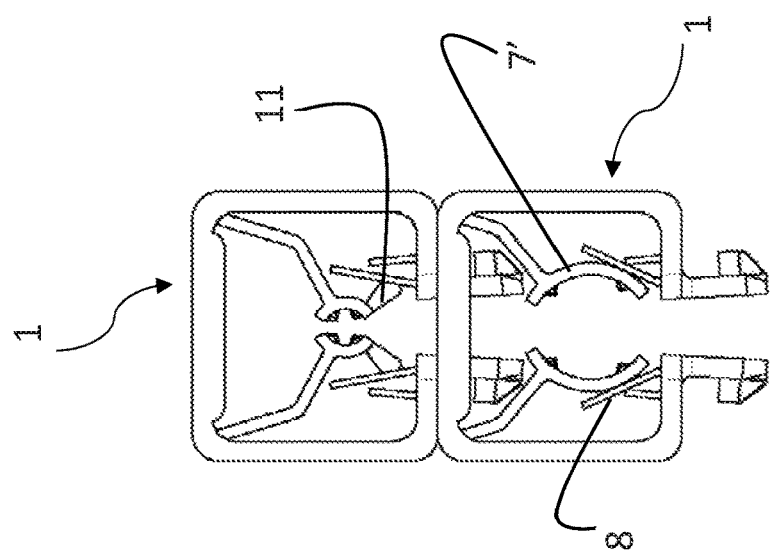
FIG. 11 is a schematic front view of two support collars, according to the previous figures, stacked on top of each other.

Said wedge 5b has an abutment surface 5d substantially parallel to the surface of the abutment plate 9 which is abutted against the surface of the abutment portion 9 of a second collar 1, as shown in FIG. 11 or against the surface of a plate 15, as illustrated in FIG. 12.

According to a further embodiment illustrated in FIGS. 5-8, and clearly visible in FIGS. 5a-8a, a T-shaped element 5e is provided on the surface of said plate 5a, with a head portion having a rounded profile and an elongated portion with an inclined surface which exerts the same function as the wedge-shaped element 5b described above, offering the advantage of further lightening the structure of the collar 1 and allowing a saving of the plastic material used for its production.

It is obviously possible to provide other embodiments of said coupling element 5, for example a coupling element 5 with two wedge-shaped elements arranged on the sides of the respective plate 5a.

Thanks to the present invention, an economical, lightweight cable support collar has been obtained which is easy to produce and solves the problem of passive intermodulation.

Furthermore, thanks to the elasticity of the plastic material used for the production and the presence of the arms 7' of the retaining means which cooperate with flaps 8, a stable support of the cable C is obtained so as to facilitate the positioning of the support collar 1 on the target structure.

The structure of the support collar 1 as described above also offers the productive advantage of being able to produce a part of said collar 1 identical for all the cables C to be retained, regardless of their diameter or the part surrounding the housing area 6: the head portion 2, the side portions 4, the abutment portions 9, the coupling elements 5 and the flaps 8. Advantageously, in fact, the only part that is moulded with different shapes, depending on the diameter of the cable to be retained, are the retaining means 7 or the retaining arms 7', and any abutment elements 11 present on said arms to ensure contact between the arms 7' and flaps 8 even when the arms 7' have reduced dimensions and are positioned in the housing area 6 too far apart from the flaps 8 to prevent their abutment contact even when the cable C is inserted.

The abutment elements 11 therefore enable this disadvantage to be overcome.

This structure of the collar 1 also allows the flaps 8 to be produced with an inclined orientation within the housing area always in the same way, during the moulding step of the collar, without having to change the orientation depending on the diameter of the cable C.

Unlike the support collars 1 described in the known art, and produced starting from a metal sheet, which cannot be used for all cables, in particular for cables having a small diameter, without the use of sleeves or the like having the function of increasing the diameter of the cable itself, or for cables having a considerable diameter, as the retaining arms formed by said sheet are not long enough to envelop the cable itself, the object of the present invention has a high versatility thanks to the presence of the combination of flaps 8 and arms 7' as described and claimed and the possible addition of abutment elements 11 and/or teeth, dowels or retaining blades 10.

The protection scope of the present invention is therefore defined by the attached claims.

The invention claimed is:

1. A support collar for a cable or a pipe, comprising:
   a head portion having at least one pass-through opening;
   two side portions that extend transversely and substantially perpendicularly from the head portion and end with respective abutment portions positioned substantially parallel to the head portion,
   each of the abutment portions having at least one respective coupling element adapted to engage the collar onto a support plate or a head portion of a second support collar,
   the side portions, the abutment portions and the head portion of the support collar defining a housing area for partially housing the cable or pipe to be supported; and
   retaining members in the housing area adapted to retain the cable or pipe firmly within the housing area,
   wherein the retaining members comprise at least one clip provided with at least two retaining arms that extend inside the housing area, the at least two retaining arms being flexibly connected to at least one of the head, side, or abutment portions of the support collar and further being configured to be elastically splayed to engage and withhold the cable or pipe within the housing area upon action of an elastic pressure exerted transversely with respect to a longitudinal development of the cable or pipe, and
   wherein each of the at least two retaining arms cooperates with at least one flap that extends into the housing area from one of the abutment portions or from the head portion to face a point of insertion of the cable or pipe between the at least two retaining arms, the at least one flap being positioned opposite the at least two retaining arms, so that the at least one flap is abutted against at least one of the retaining arms when the cable or pipe is engaged in said at least one clip.

2. The support collar according to claim 1, wherein the at least two retaining arms flexibly extend from a corresponding edge of the head portion with the side portions, and wherein the at least one flap extends from a surface facing the housing area of each abutment portion toward the head portion.

3. The support collar according to claim 1, wherein the at least one flap extends obliquely directed toward a corresponding side portion from a surface of one of the abutment portions and toward the head portion, bending toward the corresponding side portion when the at least one flap is in abutment with a corresponding retaining arm when the cable or pipe is engaged in the at least one clip.

4. The support collar according to claim 1, wherein the support collar is made of a plastic material.

5. The support collar according to claim 1, wherein each retaining arm extends inside the housing area from a respective edge disposed on an opposite side with respect to the head portion or between a side portion and a corresponding abutment portion, the at least one flap being provided on a surface of the head portion laterally with respect to the pass-through opening.

6. The support collar according to claim 1, wherein each retaining arm comprises:
   a substantially V-shaped first segment which extends from a respective edge of the support collar towards a center of the housing area;
   a second curved segment which extends from the first segment with a concavity directed towards the center of the housing area and which provides a suitable supporting surface for an outer surface of the cable or pipe to be supported; and
   a third segment which extends from the first segment, in a direction opposite to the second segment, and which has a curvature substantially equal to the second segment to define and additional housing and engagement portion of the cable or pipe.

7. The support collar according to claim 6, wherein one or more teeth, dowels or retaining blades are provided on a curved surface of the second segment and/or of the third segment and are adapted to come into contact with an outer surface of the cable or pipe to be supported, so as to increase a grip of the at least two retaining arms on the cable or pipe.

8. The support collar according to claim 6, wherein at least one abutment element is provided on a surface of each of the second segments of the retaining arms facing each side portion, so as to ensure indirect contact between the flaps and the retaining arms even when the cable or pipe to be retained has a reduced diameter with respect to dimensions of the housing area.

9. The support collar according to claim 1, wherein the at least one flap comprises at least two flaps provided for each retaining arm and are positioned parallel to each other.

10. The support collar according to claim 1, wherein the head portion, the two side portions and the abutment portions have a substantially flat development.

11. The support collar according to claim 1, wherein a central window is provided on one or both of the side portions so that one or both of the side portion is designed as a frame.

12. The support collar according to claim 1, wherein the support collar is configured so that the clip retains the cable or pipe independently and independently of a coupling of the support collar to the support plate or to the second support collar.

13. The support collar according to claim 1, wherein the at least one coupling element comprises,
  a planar element that extends transversely and perpendicularly to a surface of an abutment portion, on an opposite side with respect to the head portion, and
  a wedge-shaped element having a rounded profile that is provided on an outer surface of the planar element and has an inclined surface configured to facilitate an introduction of the coupling element in an opening of the support plate or in the pass-through opening of the second support collar.

14. The support collar according to claim 1, wherein the coupling element comprises,
  a planar element which extends transversely and perpendicularly to a surface of the abutment portion, on an opposite side with respect to the head portion, and
  a T-shaped element provided on an outer surface of the planar element and having a head portion with a rounded profile and an elongated portion with an inclined surface to facilitate an introduction of the coupling element in the opening of the support plate or in the pass-through opening of the second support collar.

\* \* \* \* \*

UNITED STATES PATENT AND TRADEMARK OFFICE
CERTIFICATE OF CORRECTION

| | | |
|---|---|---|
| PATENT NO. | : 10,927,980 B2 | Page 1 of 1 |
| APPLICATION NO. | : 16/433160 | |
| DATED | : February 23, 2021 | |
| INVENTOR(S) | : Alberto Varale | |

It is certified that error appears in the above-identified patent and that said Letters Patent is hereby corrected as shown below:

On the Title Page

Inventor Item (72): Replace --Cologne-- with --Cologno--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*